Nov. 25, 1930.  W. B. HITE, JR  1,782,533
SHOCK ABSORBER
Filed Jan. 14, 1929  2 Sheets-Sheet 1

INVENTOR:
William B. Hite, Jr.,
BY Hugh K. Wagner,
ATTORNEY.

Nov. 25, 1930.  W. B. HITE, JR  1,782,533
SHOCK ABSORBER
Filed Jan. 14, 1929  2 Sheets-Sheet 2

INVENTOR.
William B. Hite, Jr.,
BY Hugh K. Wagner,
ATTORNEY.

Patented Nov. 25, 1930

1,782,533

UNITED STATES PATENT OFFICE

WILLIAM B. HITE, JR., OF WEBSTER GROVES, MISSOURI

SHOCK ABSORBER

Application filed January 14, 1929. Serial No. 332,332.

This invention relates generally to shock absorbers, and more particularly to double-acting, fluid-restrained or hydraulic shock absorbers for vehicles and the like.

Prior to the present invention such hydraulic shock absorbers have consisted generally of a cylindrical casing whose interior was divided into a pair of diametrically opposite semi-cylindrical chambers by a stationary intermediate wall of the casing. The said chambers were each sub-divided by oscillating pistons or radial walls affixed to a central shock-operated shaft and the movement of these oscillating radial walls or wings forced fluid in the chamber on one side of such wings into the chamber on the other side of these wings through suitable ports in the stationary wall of the casing and through ports in the oscillating piston member. The ports in the oscillating piston were controlled from the exterior of the casing by a needle valve extending into the front end of the oscillating shaft. The ports in the stationary wall were provided with check valves to permit the flow of fluid in one direction only. The resistance to shock is developed by the fluid that is being forced through these check valves and controlled ports, the resistance, being less on compression of the springs so as to cushion the latter, because of the opening of the check valves, and being greater on the rebound so as to check the latter, because of the closing of the check valves. An auxiliary chamber was also provided to hold the overflow from the main or working chambers and to supply fluid to the latter as needed.

The single needle valve regulation, however, is objectionable, because it does not permit adjustment of the resistance to compression independently of the adjustment of the resistance to the rebound. Another objectionable feature is that the device must be manufactured in both right and left types, or of opposite resistances, on account of the relative opposite rotation of the shafts on the right and left sides of the vehicle. The internal parts of opposite resistance are, therefore, not interchangeable, and each right or left type must be one individual assembly. A further objectionable feature of this prior type of hydraulic shock absorber is that considerable wear occurs between the wing piston and the adjacent walls of the chamber, resulting in leakage that is not easily compensated for in the rotary piston type of absorber. A further objection is that, on account of the converging of the stationary walls and the movable walls toward the axis of the casing, the full stroke of the pistons permitted by the capacity of the chambers cannot be utilized. Accordingly, the purpose of the present invention is the provision of a shock absorber of the character described in which the aforesaid disadvantages and undesirable features will be obviated. Other objects and advantages of the present invention will be apparent in the following description of an illustrative embodiment thereof.

In the accompanying drawings, forming part of this specification, in which like numbers of reference denote like parts wherever they occur, Figure 1 is an elevation showing the manner of applying the shock absorber of this invention to the spring and frame of a vehicle;

Figure 5:
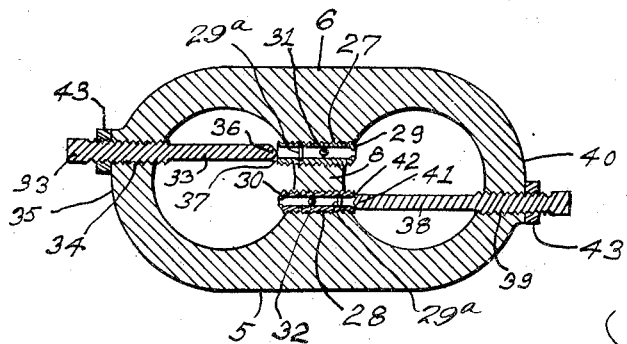
Figure 5 is a horizontal sectional view taken on the line 5—5 in Figure 3.
Figure 6:
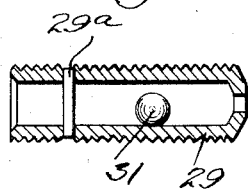
Figure 6 is an enlarged detailed longitudinal sectional view of one of the sleeves and valves.

The casing of the device comprises a lower section or base 1 and an upper section or removable cap 2 for the base 1, the said sections co-operating at their juncture 3 to form bearings 4 in their front wall 5 and rear wall 6 for a shaft 7. The lower portion of the base 1 has an intermediate wall or partition 8 extending from the front wall 5 to the rear wall 6 to divide the interior of the casing thereat into a pair of cylinders 9 and 10, in which pistons 11 and 12, respectively, are adapted to reciprocate. The shaft 7 has affixed thereto within the casing a rocker arm or lever 13 that extends from each side of the shaft 7 to points over the cylinders 9 and 10. The pistons 11 and 12 present upwardly projected lugs or ears 14 on their upper or outer end faces 15. The lugs 14 lie in the vertical plane of the rocker arm 13 and are pivotally connected thereto by links 16, each lug 14 and the corresponding end of the arm 13 being interposed between a pair of such links on either side thereof. The links 16 are preferably pivoted to the arms and lugs by suitable pins 17 that pass through suitable perforations in the opposite ends of the links and in the lugs or arm ends interposed therebetween. Links 17 and arm 13 may be economically produced by blanking or stamping them out of sheet or plate metal. Blocks 18 may be riveted to opposite sides of the arm 13 over the shaft 7 and function as spacers between the lever 13 and the adjacent shoulders or faces 19 on the inner sides of the front wall 5 and rear wall 6 of the casing. Ears 20, that form lateral extensions of the rear wall 6 of the base 1, are perforated at 21 to receive suitable bolts or screws 22 by means of which the device may be attached to the frame 23 of the vehicle. The cap 2 may be secured to the base 1 in any suitable manner, preferably by means of screws 24, that pass down through vertical holes 25 therefor in the walls of the cap 2 and thread into suitable tapped holes 26 located in the base 1 in registration with the holes 25 in the cap 2. Communication is afforded between cylinders 9 and 10 by means of holes 27 and 28 in the lower end of the intermediate wall 8, internally threaded to receive the externally threaded sleeves 29 and 30, of check valves 31 and 32, respectively. Check valve 31 permits fluid to flow only from cylinder 9 into cylinder 10, and check valve 32 permits fluid to flow only from cylinder 10 into cylinder 9, the flow in the opposite directions being substantially prevented. As shown in Figs. 5 and 6, said sleeves 29 and 30 are each provided with a pin 29ª for the retention of the check valve therein under all adjustments of the valve elements 33 and 38. The flow through sleeve 29 may be regulated by needle valve stem 33, threaded externally to fit the tapped hole 34 in the left side or wall 35 of the casing, and passing through the cylinder 9 to extend its inner end 36 into cooperating relation to the opening 37 in the sleeve 29. The flow through sleeve 30 may likewise be regulated by needle valve stem 38, threaded externally to fit the tapped hole 39 in the right side or wall 40 of the casing, and passing through the cylinder 10 to project its inner end 41 into cooperating relation to the opening 42 in the sleeve 30. Valve stems 33 and 38 are preferably secured in their adjusted positions by suitable check nuts 43. The front end 44 of shaft 7 projects exteriorly of the front wall 5 to receive a crank or shock arm 45, having an opening or bore 46 that is corrugated or fluted internally to fit the complementally and longitudinally corrugated annular surface of the projected shaft portion 44. The extreme end 47 of the shaft is threaded to receive a nut 48, that clamps the lever 45 against a shoulder 49 on the shaft 7. Shock lever 45 is pivotally connected at 50 to the upper end of an adjustable link 51, whose lower end is pivotally connected at 52 to a bracket 53, preferably bolted to the spring 54 by the usual bolts 55 that clamp the spring 54 to the axle 56.

Figure 1:
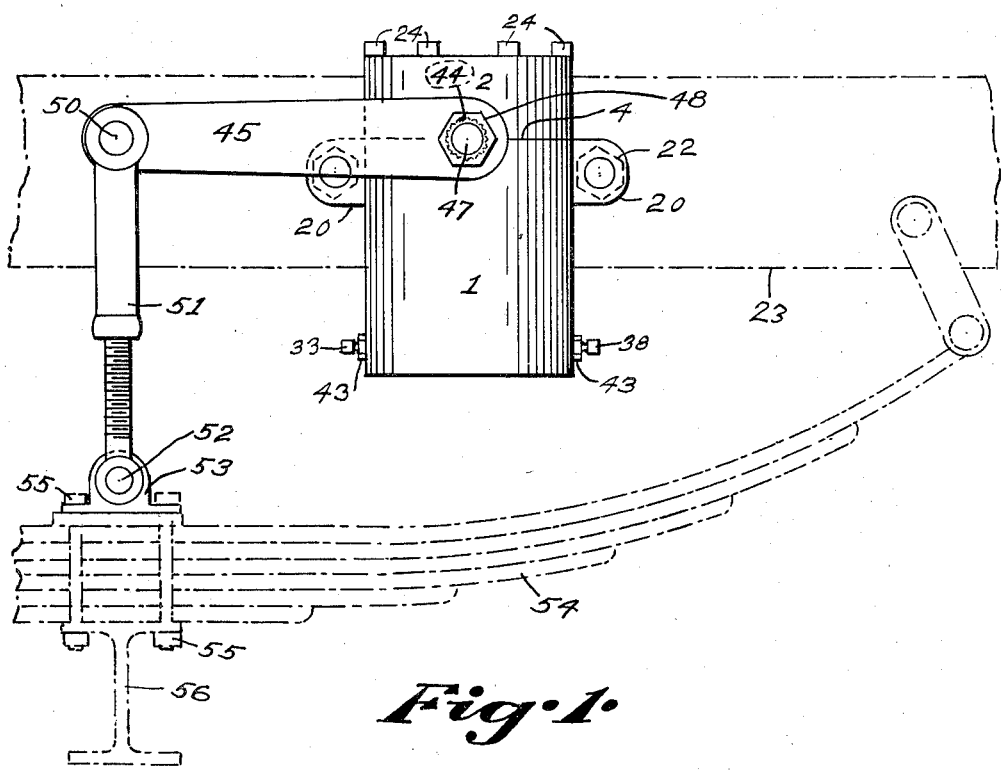
Figure 2:
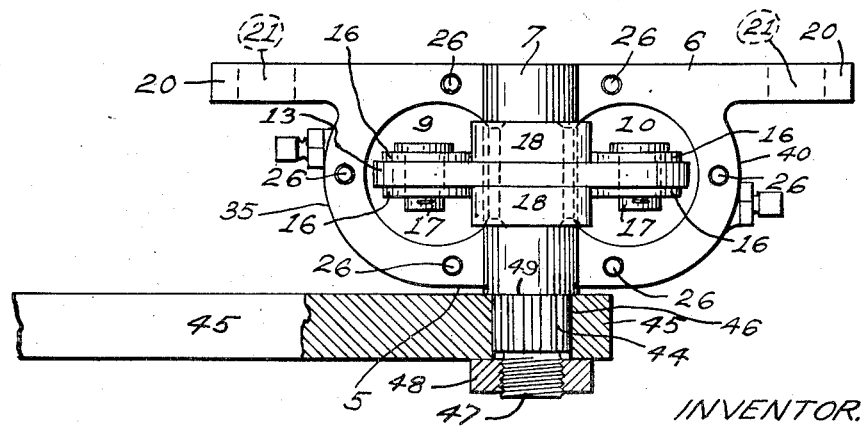
Figure 2 is a plan view of the shock absorber as it appears with the cap of the casing removed to reveal the interior thereof.
Figures 3, 4:
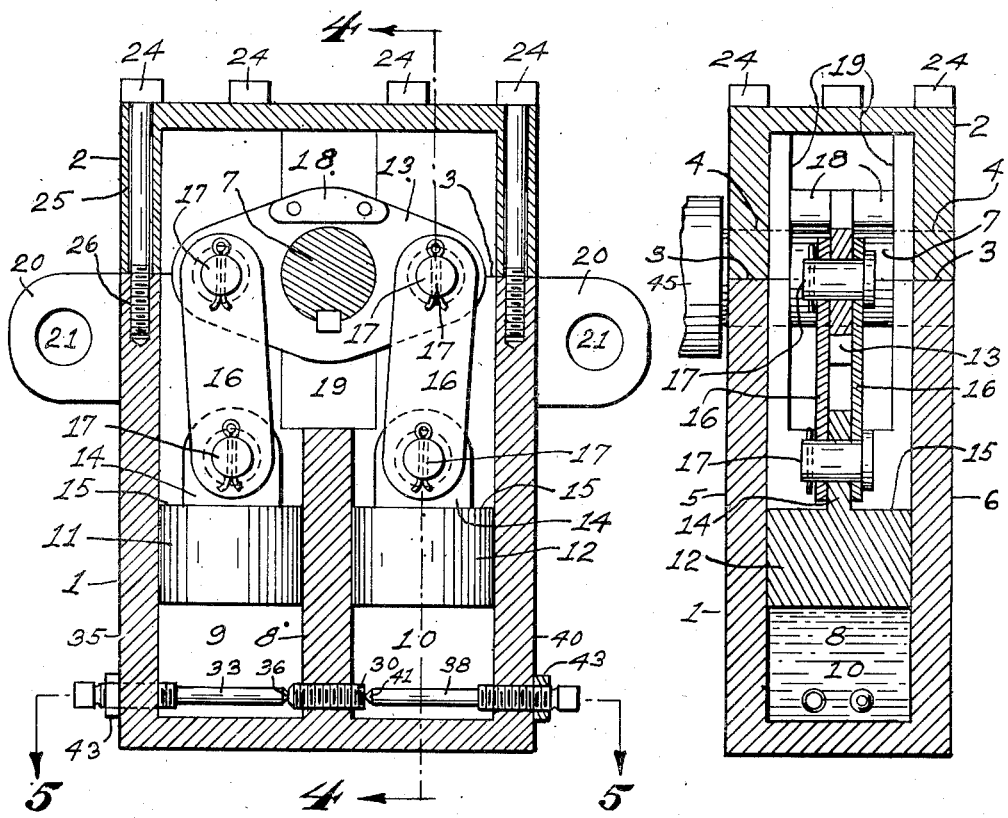
Figure 3 is a vertical sectional view of the device taken through both piston cylinders.
Figure 4 is a vertical sectional view taken on the line 4—4 in Figure 3.

The construction of the shock absorber of this invention having been described, its operation will be readily understood. The cylinders 9 and 10 are filled with a suitable liquid, such as oil or glycerine, and the valves 33 and 38 are adjusted until the desired resistance for checking the rebound and cushioning the compression of the springs 54 is obtained. It will be observed that when the device is attached to that side of the vehicle shown in Figure 1, the compression of the spring 54 will lift link 51 and rotate shock arm 45, and consequently rocker arm 13, in a clockwise direction, thereby lifting piston 11 and lowering piston 12, and forcing fluid from cylinder 10 into cylinder 9 through port 27 and valve opening 37 only so that the cushioning effect must be regulated by adjusting valve 33. On the rebound, fluid will be forced from cylinder 9 through port 28 and valve opening 42 only into cylinder 10, so that valve 38 must be adjusted to regulate the rebound. Obviously, when the device is attached to the opposite side of the machine, the conditions will be reversed, and valve 38 must be adjusted to regulate the compression and valve 33 to regulate the rebound. Since the resistance to compression may be adjusted independently of the resistance to the rebound, the device is more readily applicable to a variety of road conditions and to vehicles of different weight and dimensions, and moreover, the interchangeability of the adjusting valves renders unnecessary the production of right and left types of the device. It will be noted further that the type of piston and cylinder employed may be closely fitted so that there is little liability of undue leakage under extended and severe conditions of use, and that any leakage past the pistons will be returned to the cylinders due to their position in the lower end of the casing. The cap may also be easily removed, when the mechanism may be easily lifted out of the casing for inspection and repairs.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a shock absorber, a casing having an intermediate wall at one end to divide the interior thereat into a pair of fluid-containing compartments, means for contracting the fluid in either of the compartments while expanding the other, a pair of ports in the intermediate wall provided with check valves to limit the flow in each port to a direction opposite to that of the flow in the other port, a needle valve threading through one side of the casing and extending across the adjacent chamber to control the opening of one of the said ports, and a needle valve threading through the opposite side of the casing and extending across the other chamber to control the opening of the other port.

2. In a shock absorber, a casing having an intermediate wall at its lower end to divide the interior thereat into a pair of cylinders, lever means pivotally mounted in the casing above the cylinders, and pistons in the cylinders pivotally connected to said lever means at opposite sides respectively of its axis, the said intermediate wall having a pair of passages through its lower end adapted to effect communication between said cylinders in respective opposite directions only, a valve stem projecting through one exterior wall of the casing and an adjacent cylinder to control one of said ports, and another valve stem projecting through the other wall of the casing and the other cylinder to control the other port.

3. In a shock absorber, a casing presenting chambers adapted to contain a fluid and arranged to define an intermediate wall having a pair of independent ports in its lower portion to effect communication between said chambers and means associated with each port whereby the passage of the fluid therethrough may be controlled independently of one another and in opposite directions.

In testimony whereof I hereunto affix my signature.

WILLIAM B. HITE, Jr.